INVENTOR.
Richard M. Hortvet

April 16, 1957  R. M. HORTVET  2,789,195
APPARATUS FOR STRESS RELIEVING WELDED PIPE JOINTS
Filed Dec. 27, 1954  2 Sheets-Sheet 2

INVENTOR.
Richard M. Hortvet
BY *Andrus + Sceales*
ATTORNEYS.

United States Patent Office 2,789,195
Patented Apr. 16, 1957

2,789,195

APPARATUS FOR STRESS RELIEVING WELDED PIPE JOINTS

Richard M. Hortvet, Milwaukee, Wis., assignor to A. O. Smith Corporation, Milwaukee, Wis., a corporation of New York Application December 27, 1954, Serial No. 477,880

5 Claims. (Cl. 219—10.57)

This invention relates to an apparatus for stress relieving welded metal pipe joints and more particularly to an induction heating apparatus for stress relieving girth welded joints in large diameter pipe.

In the construction of a large diameter metal pipe line, such as a penstock for a hydro-electric power plant, the pipe sections are joined together by girth welds which are generally made from the inside of the pipe. Due to the high internal pressure to which the pipe is subjected in service, it is essential that the welds be sound and that the welded areas be substantially free of stresses.

The present invention is directed to a mobile apparatus for use within the pipe sections for stress relieving the weld area by induction heating. More specifically, as described herein, the apparatus consists of a frame which is mounted on wheels and is adapted to be moved within the pipe and aligned beneath the welded joints. The frame carries a series of induction heating coils and both the frame and the coils are expandable in diameter to permit the coils to be disposed adjacent the pipe during the stress relieving operation and are contractable after stress relieving to permit the apparatus to be freely moved within the pipe. Electrical energy is supplied to the coils to induce a current in the weld area to heat the same and relieve the stress therein. The amount of the electrical energy supplied to the individual coils or the spacing of the coils is varied to produce a temperature gradient from the welded joint longitudinally outwardly through the weld area.

The present invention provides an apparatus for conveniently heat treating the weld area of large diameter pipes to relieve the stress therein. The frame and the induction heating coils are readily expandable for the heat treating operation and are contractable after heat treatment in preparation for moving the apparatus to a second weld area to be treated.

The accompanying drawings illustrate the best mode presently contemplated of carrying out the present invention.

Figure 1:
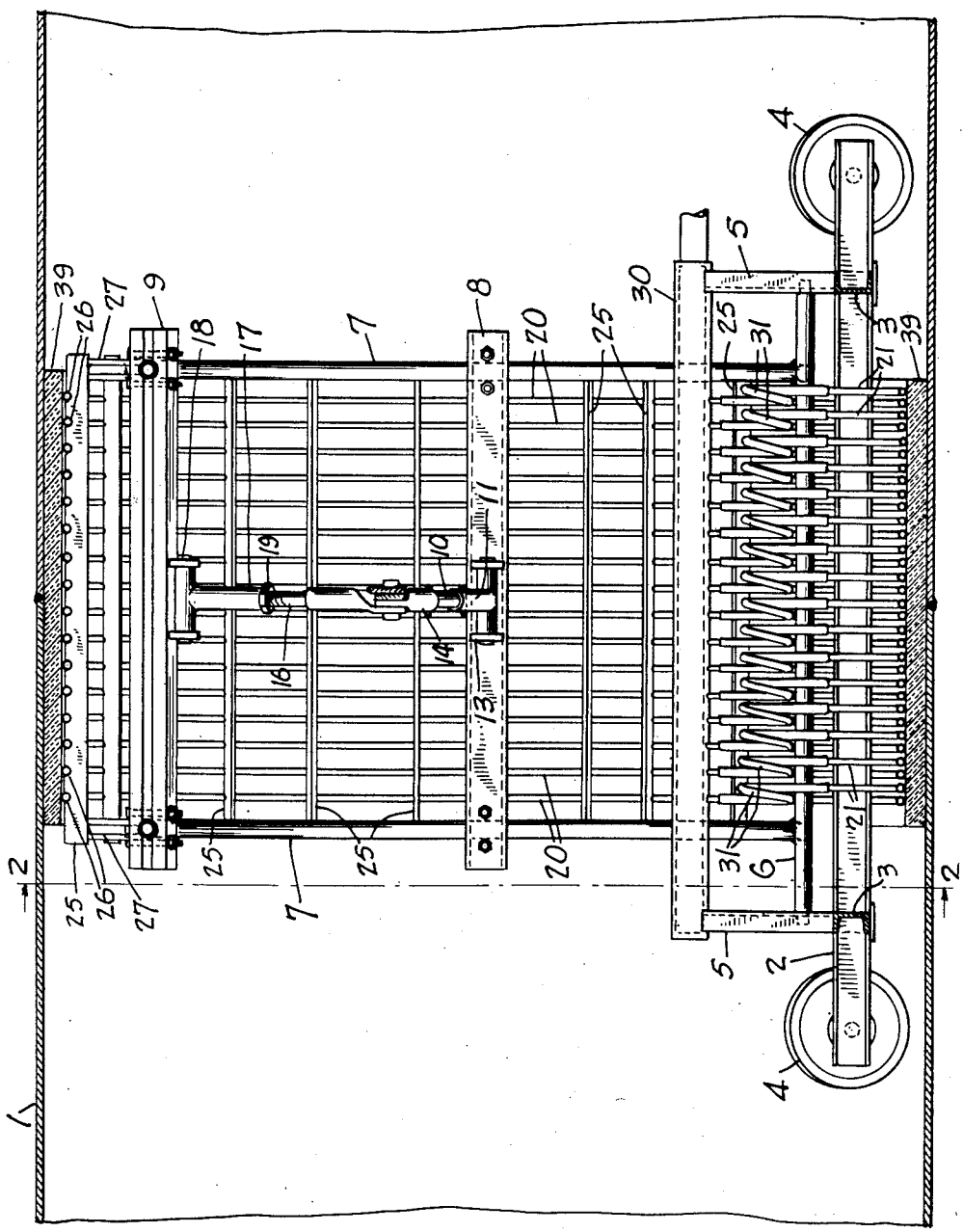
Figure 1 is a vertical longitudinal section of the apparatus embodying the invention.
Figure 2:
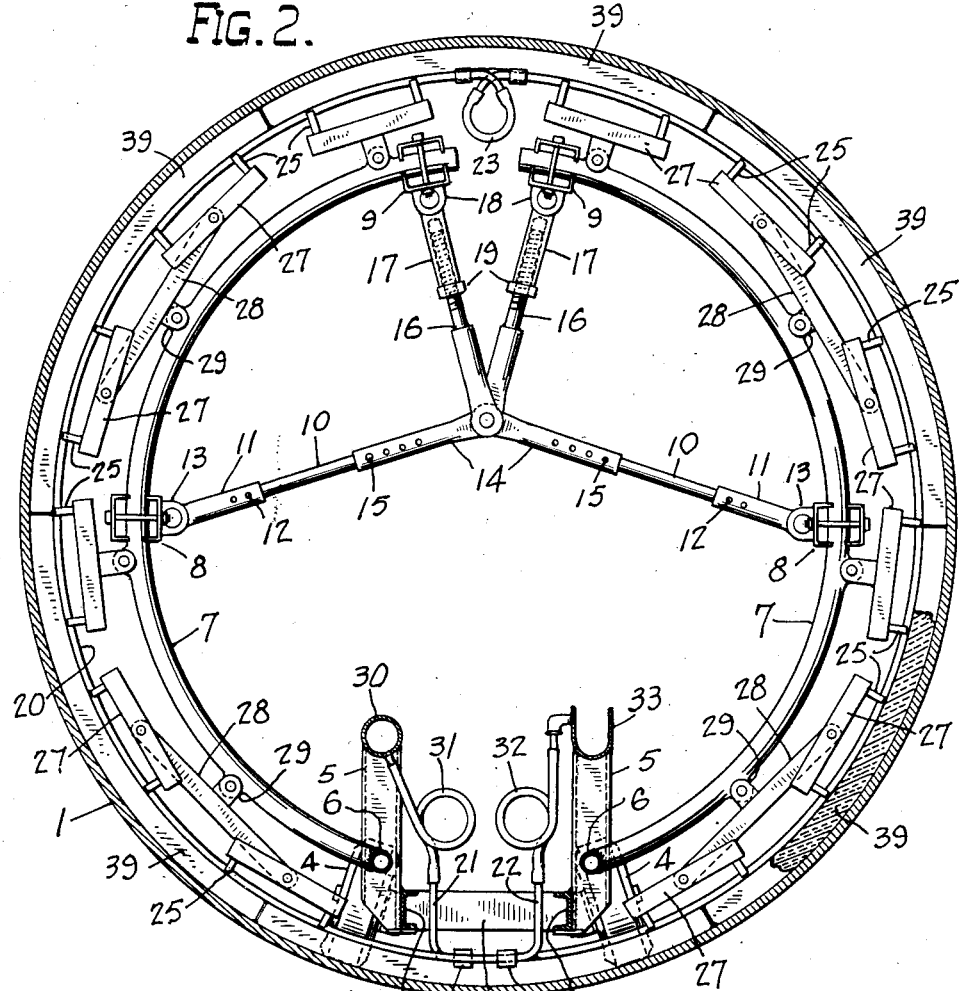
Fig. 2 is a sectional view of the apparatus in the expanded position within a pipe section taken on line 2—2 of Figure 1.

The drawings illustrate an apparatus for stress relieving the welded girth joints in a large diameter pipe 1 such as the penstock.

The apparatus includes a mobile carriage or frame which consists of a pair of longitudinally extending beams 2 which are connected adjacent their ends by cross beams 3.

To permit the carriage to be readily moved within the pipe 1, a wheel 4 is rotatably secured to the end of each beam 2 outwardly of the cross beams 3. The wheels 4 are adapted to ride on the internal surface of the pipe and permit the carriage to be readily moved from one stress relieving location to the next. A pair of upstanding supports 5 are secured to the beams 2 adjacent each end of the carriage, and a pair of longitudinally extending shafts 6 are positioned between each corresponding pair of supports 5 and trunnioned therein. The carriage supports a pair of expandable, generally circular frames and each frame consists of a pair of arcuate frame members 7 which are attached, as by welding, at their lower extremities to the corresponding shafts 6. By means of the pivotal connection of the shafts 6 in their supports, the frame members can be pivoted outwardly or inwardly to provide the frame with a greater or lesser diameter within the predetermined limits.

Each corresponding pair of frame members 7 are connected by a longitudinally extending central tie beam 8 and an upper longitudinally extending tie beam 9. Beams 8 and 9 provide rigidity and strength for the frame.

The frame is expanded and contracted by a toggle mechanism which includes a pair of arms 10 having the outer end of each arm telescopically connected to a tube 11. The arms 10 are adjustably secured within tubes 11 by pins 12 which are selectively received within a series of aligned openings in the arms 10 and tubes 11. Each of the tubes 11 is pivotally atttached to a lug 13 which is secured to a respective central tie beam 8.

The inner end of each arm 10 is telescopically received within a central yoke 14. The arms 10 are adjustably secured within yoke 14 by pins 15 which are adapted to be selectively engaged within a series of suitable aligned openings in the yoke and the arms.

By proper adjustment of the pins 12 and 15, the arms 10 can be extended or contracted to pivot the frame members 7 outwardly or inwardly and thereby increase or decrease the effective diameter of the frame.

A finer adjustment of the expansion and contraction of the frame is achieved by means of arms 16 which are pivotally connected at their inner end to yoke 14. The outer end of each arm 16 is slidable within a tube 17. Each tube 17 in turn is pivotally attached to a lug 18 which is secured to the corresponding upper tie beam 9. Nuts 19 are threadedly engaged on the outer end portions of arms 16 and the nuts abut the lower end of the corresponding tubes 17. By the threaded adjustment of nuts 19 a fine adjustment of the expansion and contraction of the frame can be obtained. Thus, threading the nuts outwardly on arms 16 results in the frame members 7 being pivoted outwardly to expand the frame.

To heat the welded area and relieve the stresses therein, a series of induction heating coils 20 are secured to the frame and aligned with the weld area to be stress relieved. Each of the coils 20 is formed of a hollow metallic tube and is provided with inwardly extending ends 21 and 22 which are disposed at the lower extremity of the coil. The coils 20 conform generally to the curvature of the interior surface of the pipe 1 and are adapted to be disposed adjacent the pipe during the stress relieving operation. The coils 20 are formed with slightly more than one convolution whereby the end portions of the coils are co-extensive to provide a portion of overlap. With this construction the coils can be expanded and contracted in diameter without bending or deforming.

Additional freedom for expansion and contraction of the coil is provided by interrupting the coil at the upper portion thereof and connecting the ends of the coil at the interruption by means of a flexible looped tube 23.

The coil sections are connected electrically at the interruption by a suitable conductor 24.

The coils 20 are supported by the frame by means of a plurality of spacer blocks 25 which are provided with a series of grooves 26 to receive the coils 20. The spacer blocks 25 are made with a refractory material and serve to support and space the coils 20. The spacer blocks 25 are attached to brackets 27 and each pair of adjacent brackets are pivotally attached to an arm 28 Each arm 28 is pivotally attached to a lug 29 secured to frame member 7. With this structure a firm bearing engagement is insured between the coils and the pipe 1.

A cooling liquid is supplied to each of the coils through a duct 30 which is supported by the supports 5. The duct 30 is connected to a suitable source of cooling fluid, not shown. Communication is provided between the duct 30 and the end 21 of each coil by a looped tube 31 which is made of a flexible material such as rubber or the like. The flexible connection provided by looped tube 31 will permit the expansion and contraction of the coils 20 without disturbing the communication between the duct 30 and the coils.

A cooling fluid is withdrawn from the end portion 22 of each coil through a flexible looped tube 32 which connects the end 22 to a discharge duct 33. The discharge duct 33 conducts the cooling fluid to a location of discharge.

Electrical energy is supplied to each coil 20 through a lead 34 which is connected by clamp 35 to an end portion of the coil. The electrical energy is withdrawn from the coil through a second lead 36 which is attached by means of clamp 37 to the other end portion of coil 20 adjacent the position of attachment of lead 34.

Figure 3:
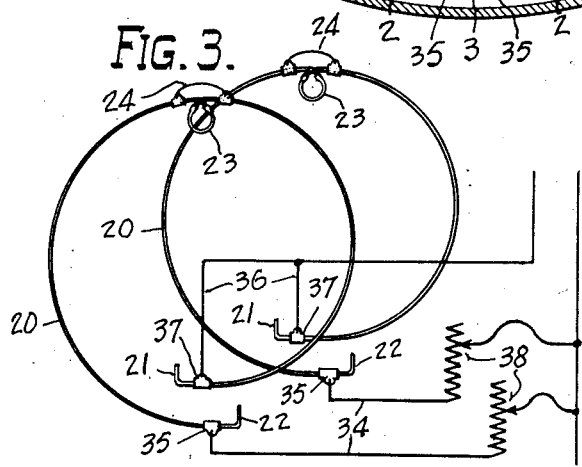
Fig. 3 is a diagrammatic view showing the electrical connection to two coils.

To vary the amount of electrical energy supplied to each coil 20, a variable resistance 38 may be placed in series with the coil, as shown in Fig. 3.

To produce a temperature gradient from the weld joint outwardly in a longitudinal direction in the pipe, the amount of electrical energy to the coils 20 may be progressively increased from the end coils toward the central coil aligned beneath the weld joint by varying the resistances 38. Alternately, several adjacent coils may have the same energy input rather than each coil having a different energy input in order to produce the desired temperature gradient or the spacing of the coils may be varied to produce the gradient.

To maintain the temperature gradient across the weld area, a series of insulating blocks 39 are disposed between the coils 20 and the pipe 1. Each of the blocks 39 is substantially contiguous with adjacent blocks to provide an insulating ring between the coils and the pipe to protect the coils from the heat induced into the pipe and prevent dissipation of the induced heat. To prevent heat loss from the pipe to external objects, a layer of insulating material, not shown, may be disposed around the pipe at the weld area.

In operation of the present apparatus the frame and coils 20 are contracted through adjustment of arms 10 and 16. With the frame in the contracted position the apparatus is moved within the pipe until the central coil 20 of the series of coils is substantially aligned with the weld joint. The frame is then expanded with the initial adjustment of expansion being made by the attachment of arms 10 within the corresponding tubes 11. After the initial adjustment has been completed the insulating blocks 39 are disposed between the coils 20 and the pipe 1.

With the insulating blocks in position the frame is expanded outwardly to a greater degree by the fine adjustment of threading arms 16 outwardly of the corresponding tubes 17. The arms 16 are threaded outwardly until the coils bear firmly against the insulating blocks 39.

With the coils properly positioned with respect to the pipe, electrical energy is then supplied to the coils and the cooling fluid is also introduced therein. The electrical current passing through the coils 20 induces a current in the pipe which heats the same and relieves the stresses therein. As previously pointed out a temperature gradient is maintained across the weld area with the highest temperature being at the welded joint and the temperatures progressively decreasing in a longitudinal direction from the joint.

After the stress relieving operation is completed the frame is collapsed and the apparatus is moved within the pipe to a second location in preparation for stress relieving the same.

The present invention provides an apparatus for conveniently heat treating the welded joint of large diameter pipe to relieve the stresses set up therein by welding. The apparatus is mobile and can be readily moved within the pipe and easily centered beneath the welded joint. The frame and coils are expandable to permit the coils to bear firmly against the pipe during the heating and are readily contractable after heat treatment so that the apparatus can be moved to a second location.

Various modes of carrying out the invention are contemplated as being within the scope of the following claims particularly pointing out and distinctly claiming the subject matter which is regarded as the invention.

I claim:

1. An apparatus for stress relieving welded girth joints in relatively large diameter tubular articles, which comprises a mobile frame adapted for movement within the tubular article, a generally circular induction heating coil supported by the frame in alignment with the welded joint to be stress relieved and having a diameter slightly smaller than the internal diameter of the article, means for insulating the coil from the article, means for expanding said frame in cross-sectional dimension to produce a corresponding expansion in the diameter of the coil and force the coil into induction heating position with respect to the welded joint of the article and for contracting said frame in cross-sectional dimension to produce a corresponding contraction in diameter of the coil and thereby remove the coil from said induction heating position, means for maintaining the generally circular configuration of said coil during the expansion and contraction of the same, and means for supplying electrical energy to the coil when the coil is expanded to induce a current in the article to heat the same and relieve the stresses therein.

2. An apparatus for stress relieving welded girth joints in relatively large diameter tubular articles, which comprises a mobile frame adapted for movement within the tubular article, a generally circular induction heating coil supported by the frame in alignment with the welded joint to be stress relieved and having a diameter slightly smaller than the internal diameter of the article, means for insulating the coil from the article, means for expanding said frame in cross-sectional dimension to produce a corresponding expansion in the diameter of the coil and force the coil into induction heating position with respect to the welded joint of the article and for contracting said frame in cross-sectional dimension to produce a corresponding contraction in diameter of the coil and thereby remove the coil from said induction heating position, means for maintaining the generally circular configuration of said coil during the expansion and contraction of the same, means for supplying electrical energy to the coil when the coil is expanded to induce a current in the article to heat the same and relieve the stresses therein, cooling means for circulating a cooling fluid within the coil during heating thereof, and means for providing relative movement between the coil and said cooling means as said coil is expanded and contracted to prevent deformation of the coil.

3. An apparatus for stress relieving welded girth joints in relatively large diameter tubular articles which comprises a mobile carriage adapted for movement within the tubular article, a series of generally circular axially aligned induction heating coils provided with end and center coils supported by the carriage and disposed with the center coil of said series in substantial alignment with the welded joint to be stress relieved, each of said coils having a diameter slightly less than the internal diameter of the article, a layer of insulating material disposed between each coil and the article, means connected to the carriage for expanding the coils in diameter to force the coils into induction heating position with respect to the welded joint of the article and for contracting the coils in diameter to remove said coils from said induction heating position, means associated with each coil for maintaining said coil in substantial circular configuration during the expansion and contraction thereof, means for supplying electrical energy to each individual coil, and means for varying the amount of electrical energy supplied to each coil with the amount of electrical energy being supplied to said center coil being greatest and the amount of electrical energy being supplied to the coils at the respective ends of the series being the least.

4. An apparatus for stress relieving welded girth joints in relatively large diameter tubular articles which comprises a mobile carriage adapted for movement within the tubular article, a pair of generally semicircular arms pivotally connected at the lower extremities thereof to said carriage, a series of generally circular induction heating coils disposed with the middle coil of said series in substantial alignment with the welded joint to be stress relieved, said coils having a diameter slightly less than the internal diameter of the article, a layer of insulating material disposed at the outer surface of each of said coils, a plurality of insulating supports supporting said coils in spaced relation to each other, means pivotally attaching said insulating supports to said arms, means connected to said arms for pivoting said arms outwardly toward said article to expand said coils in diameter and force the coils into induction heating position with respect to the welded joint of the article and for pivoting said arms inwardly toward the axis of the coils to contract the coils in diameter and remove the coils from said induction heating position, and means for supplying electrical energy to the coils when the coils are expanded to induce a current in the article to heat the same and relieve the stresses therein.

5. An apparatus for stress relieving welded girth joints in relatively large diameter tubular articles which comprises a mobile carriage adapted for movement within the tubular article, a pair of generally semicircular arms pivotally connected at the lower extremities thereof to said carriage, a series of generally circular induction heating coils disposed with the middle coil of said series in substantial alignment with the welded joint to be stress relieved, said coils having a diameter slightly less than the internal diameter of the article, a layer of insulating material disposed on the outer surface of each of said coils, a plurality of insulating supports supporting said coils in spaced relation to each other, means pivotally attaching said insulating supports to said arms, means connected to said arms for pivoting said arms outwardly toward said article to expand said coils in diameter and force the coils into induction heating position with respect to the welded joint of the article and for pivoting said arms inwardly toward the axis of the coils to contract the coils in diameter and remove the coils from bearing engagement with said article, means for supplying electrical energy to the coils when the coils are expanded to induce a current in the article and produce a temperature gradient across the welded joint with the highest temperature being at the welded joint and the temperature progressively decreasing in the longitudinal direction from the joint, and means for supplying a cooling fluid to each of said coils and for withdrawing said fluid from the coils.

References Cited in the file of this patent

UNITED STATES PATENTS

| | | |
|---|---|---|
| 2,180,513 | Fugill et al. | Nov. 21, 1939 |
| 2,282,322 | Denneen et al. | May 12, 1942 |
| 2,472,445 | Sprong | June 7, 1949 |
| 2,582,955 | Body | Jan. 22, 1952 |
| 2,649,529 | Smith et al. | Aug. 18, 1953 |